D. W. MINNICH.
AUTO ATTACHMENT.
APPLICATION FILED JAN. 28, 1920.
1,416,569. Patented May 16, 1922.
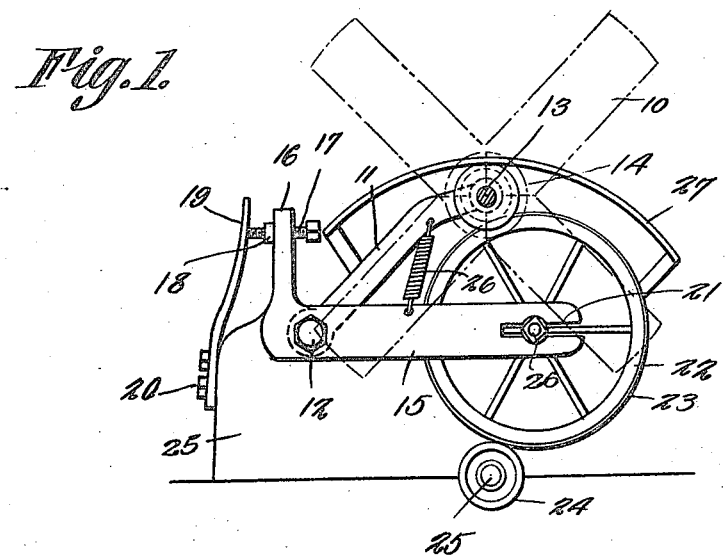
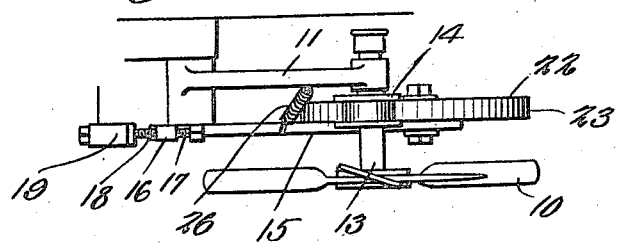
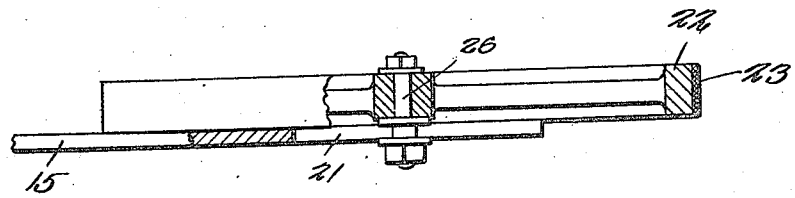

UNITED STATES PATENT OFFICE.

DELBERT W. MINNICH, OF WADSWORTH, OHIO.

AUTO ATTACHMENT.

1,416,569. Specification of Letters Patent. Patented May 16, 1922.

Application filed January 28, 1920. Serial No. 354,712.

*To all whom it may concern:*

Be it known that I, DELBERT W. MINNICH, a citizen of the United States, residing at Wadsworth, in the county of Medina and State of Ohio, have invented a new and useful Auto Attachment, of which the following is a specification.

This invention relates to an automobile attachment or fan driving means adapted to be applied to various types of automobiles and intended to obviate the necessity of employing a belt, the device operating noiselessly and positively, and being capable of application without making alterations in the automobile, such as drilling holes in the chassis frame or using additional bolts.

In the accompanying drawings:

Figure 1 is a front elevation showing my improved fan driving means;

Figure 2 is a plan view thereof; and

Figure 3 is an enlarged horizontal sectional view with parts broken away and parts in elevation.

The numeral 10 designates the motor cooling fan of an automobile, the fan being journaled on the free end of an arm or support 11 mounted on a bolt 12 carried by the engine frame 25, the fan shaft 13 having the usual pulley 14 by which it is ordinarily driven through the medium of a belt. In the present instance, there is provided a horizontal bracket arm or support 15 which is pivoted on the bolt 12 and has an upwardly extending projection 16 at one end, the projection being apertured to receive an adjustable set screw 17 transversely therethrough. The set screw 17 is held in an adjusted position by a nut 18, whereby the tension spring 19, acting on the bolt, may be regulated, said spring being fixed on the frame 25 as indicated at 20.

The arm 15 extends horizontally and is provided with a slotted bearing 21 rotatably supporting the shaft 26 of a friction pulley or rotatable member 22 having a suitable anti-slipping covering 23 adapted to contact with the pulley or rotatable member 14. The member 22 is driven from a rotating part of the automobile, such as a pulley 24 carried by the motor shaft 25 or other suitable part of the automobile. Owing to the tension of the spring 19 acting on the set screw or bolt 17 of the projection 16, the arm 15 will be held downwardly displaced so that the periphery of the pulley 22 will be held in contact with the periphery of the drive pulley 24 to insure rotation of the former as the crank shaft is rotated. A contractile spring 26 preferably of the helical type, is disposed to connect the arms 11 and 15, thus serving to hold the former downwardly displaced whereby the friction wheel or pulley 14 will be held in contact with the periphery of the pulley or friction wheel 22, the spring 26 being of less tension than the spring 19 for this purpose.

Thus, as the shaft rotates, rotation will be imparted to the pulley 24 which will be transmitted to the pulley or friction wheel 22, then to the pulley 14 so as to drive the same for cooling purposes. In order to protect the parts from water dripping from a leaking radiator or the like, whereby to prevent inoperativness of the device, as often occurs where the devices are constructed in the ordinary way, I provide a covering in the form of a shield 27 over the parts so as to prevent water from a leaking radiator from dropping thereon and preventing the device from getting out of commission. The arm 15 and the extension 16 are preferably made of light material such as aluminum, so as to be applied merely by moving the bolt 12 of the arm 11 and then reapplying the bolt in the manner shown and described, the arm 15 being first placed in position without necessitating any alteration in the frame construction. The device is shown in connection with a Ford automobile, but it is obvious that it can be applied to various types of automobiles within the scope of the invention by means of slight changes, without altering the principle involved or departing from the spirit of the invention.

Having thus described the invention what I claim is:

1. In an automobile attachment, a frame; a rotatable drive member journaled on the frame; supports pivoted to the frame for movement with respect to each other and with respect to the frame; a rotatable member journaled on each support; a spring connection between the supports and holding the rotatable members in engagement; a fan operatively connected with the rotatable member of one support; and means cooperating with the other support to hold the rotatable member of said other support in engagement with the rotatable drive member.

2. A fan drive attachment for automobiles, comprising the combination with the frame, an arm bolted to the frame, and a fan at the free end of the arm and provided with a shaft having a belt pulley forming a friction wheel; of a bracket mounted on said bolt and having an upward projection, an adjusting screw mounted in said projection, a tension spring suitably mounted and acting on said projecting screw, said bracket extending horizontally and provided with a slotted bearing, a tension spring connecting said arms and normally holding the first mentioned arm toward the last mentioned arm, a friction wheel mounted in said slotted bearing for rotation and with which said friction pulley contacts and a suitably driven friction wheel in contact with the periphery of the second-named friction wheel for driving the latter to operate the fan.

3. A fan drive attachment for automobiles, comprising the combination with the frame; of an arm bolted to the frame, a fan at the free end of the arm and provided with a shaft having a belt pulley forming a friction wheel, a bracket mounted on said bolt and having an upward projection, an adjusting screw mounted in said projection, a tension spring suitably mounted and acting on said projecting screw, said bracket extending horizontally and provided with a slotted bearing, a tension spring connecting said arms and normally holding the first mentioned arm toward the last mentioned arm, a friction wheel mounted in said slotted bearing for rotation and with which said friction pulley contacts and a suitably driven friction wheel in contact with the periphery of the second-named friction wheel at the diametrically opposite side of the second named friction wheel, said first-named spring being in the form of a resilient strip, and an arcuate shield over said friction wheels and shafts thereof.

4. In an automobile attachment, a frame; a rotatable drive member journaled on the frame; supports pivoted to the frame for movement with respect to each other and with respect to the frame; a rotatable member journaled on each support; a spring connection between the supports and holding the rotatable members in engagement; a fan operatively connected with the rotatable member of one support; a spring carried by the frame, and an adjusting device mounted in the other support, the spring coacting with the adjusting device to hold the rotatable member of said other support in engagement with the rotatable drive member.

In testimony that I claim the foregoing as my own, I have hereto affixed my signature in the presence of two witnesses.

DELBERT W. MINNICH.

Witnesses:
 Wm. H. Bowers,
 G. A. Bicksler.